United States Patent Office 3,176,471
Patented Apr. 6, 1965

3,176,471
METHOD OF SEALING OR CONSOLIDATING EARTHEN FORMATIONS
Joseph Ramos and Homer C. McLaughlin, Duncan, Okla., assignors to Halliburton Company, Duncan, Okla., a corporation of Delaware
No Drawing. Filed Aug. 8, 1961, Ser. No. 129,972
17 Claims. (Cl. 61—36)

The present invention relates to chemical grouting and well treating operations and more particularly to a new and improved method of sealing water-bearing formations and/or consolidating loose or unconsolidated sands utilizing a urea-formaldehyde resin concentrate.

In current well servicing operations employing a urea-formaldehyde resin as a sealing material, it is customary to transport large quantities of formaldehyde solution and urea in suitable separate containers to the well site or mixing area. As the formaldehyde is in a liquid state and the urea is in a solid state, normally at least two vehicles are required to deliver the products in the desired area. As is well known in the art, formaldehyde or formaldehyde solution is a solution of about 37% by weight of formaldehyde gas in water with usually about 10–15% methanol added to prevent polymerization. Thus as can easily be seen formaldehyde solution is about 50% water, which means that only about one-half as much formaldehyde may be transported by a particular vehicle as might otherwise be transported if the water can be eliminated. The large amount of methanol presents a further problem of handling because of its toxic characteristics. Precautions must be taken to prevent over inhalation or percutaneous absorption.

The present invention overcomes these problems by utilizing a resin prepared at the well site or other desired area from a urea-formaldehyde concentrate readily available on the commercial market. The resin prepared from such concentrate is applied to earth formations in construction, grouting and/or oil or water well projects.

The present invention has many practical applications, among which are, shutting off or sealing off water which might be co-produced in oil wells or while air drilling oil wells; shutting off water which might otherwise flood or enter mines, subterranean storage facilities, excavated construction sites, basements and cellars; eliminating seepage of water through dams or through earth adjacent the dams; diverting a subterranean water stream or formation away from sites to be used for construction or from other areas in which the water is undesired; consolidating loose sand and preventing the sand from filling and choking the well bore or co-producing with oil in oil wells and water in water wells; and consolidating loose earth or sand.

Broadly, the present invention comprises mixing a urea-formaldehyde resin concentrate with water and an additional amount of urea to produce a low viscosity resin solution, injecting such resin solution into a pre-selected earthen formation, allowing the resin solutions to set to a solid material after the solution has been properly catalyzed, which seals off water flow in the formation and/or consolidates a loose formation.

The present invention as a result of the use of such a urea-formaldehyde concentrate has numerous advantages over prior art resins and methods. Some of the principal advantages are: a better resin is produced and with a higher percent of solids therein; an initially low viscosity resin results which facilitates the injection of the resin into an earthen formation; can be produced more economically, the total cost being less than the cost of preparing a resin from commercial formalin and urea; poisonous, chemically non-combining stabilizers for the formaldehyde, such as methanol have been substantially reduced or reduced to amounts of low human toxicity, and the resin when set, makes a hard mass.

Soft or powdery precipitates and soft or firm gels now in common use in grouting operations and well treatment operations contribute only weakly to the consolidation of loose sand and are of course incapable of controlling the flow of water in large voids or cavities in earth formations.

A principal object of the present invention is to provide a new and improved grouting chemical which is not only inexpensive, but which can develop a high compressive strength.

The present invention is particularly useful in grouting operations as it provides a sealing or grouting material which is a fluid of very low initial viscosity, usually about 10 centipoises. This is a highly desired characteristic for obtaining good injection rates and distribution in formations having a low permeability. This low viscosity is retained throughout the major portion of the fluid life of the grouting resin. The resin prepared and used is a water base resin which has a great affinity for siliceous surfaces, which aids in obtaining a good distribution of grout. The resin has good adhesive properties after polymerization. The reaction or setting time can be varied over a relatively wide range, from about 4 minutes to about 1 hour or longer if desired. Such characteristic provides a versatility hitherto unknown for injecting into soils of various permeabilities.

Sand consolidated with the resin of this invention has had a compressive strength of over 100 tons per square foot in controlled tests. Such a compressive strength compares to about 5 tons per square foot obtained, under similar conditions, with gel producing materials currently in use.

Another object of the present invention is to provide a new and improved method of utilizing a urea-formaldehyde resin as a sealing or earth consolidating material in grouting and/or well treating operations.

Other objects and advantages of the present invention will become more readily apparent from a consideration of the following description and claims.

The urea-formaldehyde resein concentrate preferably used in the present invention is sold commercially by Allied Chemical and Dye Corporation under the trade name of UF Concentrate–85 and by Hercules Powder Company under the trade name of UFC–8545. Such concentrate is a solution of formaldehyde and urea reacted in a small amount of water. It contains about 85% solids combined in a formaldehyde to urea mol ratio of about 4.8 to 1. A typical sample of the concentrate contains about 60% formaldehyde and 25% urea.

For all practical purposes, the two products UF Concentrate 85 and UFC–8545 are the same. The properties of each are essentially the same and the reactions of the two materials are almost identical. The formaldehyde to urea ratio is slightly higher in the UF Concentrate 85 than the concentrate UFC–8545.

Properties of the concentrates as claimed by the manufacturers are as follows:

|  | UF Con. 85 | UFC–8545 |
|---|---|---|
| Formaldehyde _____ percent by wt__ | 59 | 57–61 |
| Urea _____ do____ | 26 | 24–28 |
| Solids _____ do____ | 85 | 85 min. |
| Formaldehyde:Urea mol ratio _____ | 4.6:1 | 4.5:1 |
| Color APHA _____ | 10 max. | 15 |
| pH as produced _____ | 8.0 approx. | 8.5 |
| Viscosity at 25° C _____ cps__ | 300 max. | 300 |
| Buffer capacity _____ | 15.0 max. | 15 |
| Methanol _____ percent by wt__ | 0.3 max. | _____ |

These liquid concentrates offer the highest solids content consistent with an easy-to-handle liquid form which is of a high purity and stable in storage. It should be understood that although the concentrates set forth above are particularly useful in the present invention, the invention is not limited to the use of such specific concentrates and any other suitable urea-formaldehyde concentrates may be used without departing from the scope of the invention.

The term urea-formaldehyde concentrate or concentrate as used throughout the specification and claims refers to the concentrate or concentrates identified as UFC–8545 and UF Concentrate 85 or any other similar urea-formaldehyde concentrate having a high percentage of solids content.

In preparing the resin to be used in a typical grounting operation the concentrate may be mixed by the "batch" method or by the "two stream continuous system."

"Batch" method

In the batch method, the concentrate is dissolved in water, mixed in a single container, and injected into the earth formation to be grouted or sealed by a single pump. Water for dissolving the concentrate is normally available at the operating site.

A typical example of preparing a 100 gallon resin solution for grouting or other earth injection is as follows:

(1) 49 gallons of water are placed in a suitable container, to which, (2) 142 pounds of urea are mixed therewith.

(3) 33.4 pounds of ammonium chloride are added and mixed in the solution as an accelerator.

(4) In order to control the setting time of the resin, predetermined amounts of a setting or hardening agent such as hexamethylenetetramine (HMT) are added to the mixture. The HMT acts as a retarding agent and the more HMT added to the solution, the longer the "cloud time." "Cloud time" is the amount of time it takes for the clear solution to begin to have a cloudy appearance. Setting or hardening of the resin follows soon after "cloud time"; thus "cloud time" is a warning signal that the resin is about to harden. "Cloud time" graphs or charts for various temperatures are easily prepared and can be used by an operator to quickly and easily determine the amount of retarding agent and accelerator to be added to the solution to cause the setting of the resin to occur after a predetermined amount of time has elapsed.

(5) 36.4 gallons of concentrate is added and mixed with the solution. This is the last step in the mixing operation and "cloud time" begins at this stage. The resin solution is then pumped or otherwise injected into the cavity to be plugged or formation to be consolidated. The resin is then allowed to set.

Two stream continuous system

One of the advantages of using the concentrate of this invention is that it is only mildly corrosive and may be used with standard containers and pumping units. In the "two stream continuous system," two separate solutions, e.g., A and B, are prepared of approximately equal volumes and pumped through separate lines so that no mixing occurs until the two streams are joined together at the well head or other mixing site. Setting or "cloud time" begins when the two solutions are mixed together. In preparing two solutions of 50 gallons each, the following is a typical example:

Solution A—36.4 gallons of concentrate is added to 13.6 gallons of water in a suitable container and mixed together.

Solution B—To 35.5 gallons of water in a separte suitable container are added 142 pounds of urea and 33.4 pounds of ammonium chloride, which are mixed in the solution as added. HMT is added in the predetermined desired amount.

Each of the solutions is then pumped simultaneously through separate lines so as to meet at the well head for mixing together. "Cloud time" begins as the two solutions are mixed with each other. The mixture of A and B is then injected into the formation to be grouted or otherwise treated and then allowed to set or harden.

When preparing the above solutions or otherwise working with urea-formaldehyde concentrates, the same safety precautions normally used in handling formaldehyde solutions should be taken. Rubber gloves, goggles and protective clothing are recommended, as well as adequate ventilation and the use of suitable respirators.

Using he following formulation, a solution of resin was injected into a creek sand formation. The resin set in approximately 10 minutes and imparted a compressive strength of from 1,050 to 1,840 p.s.i. to the formation treated which was just loose sand:

| Material: | | Amount |
|---|---|---|
| Urea-formaldehyde concentrate | gallons | 36 |
| Water | do | 50 |
| Urea | pounds | 144 |
| Hexamethylenetetramine | do | 3 |
| Ammonium chloride | do | 42 |

The solution had a total volume of about 100 gallons, a specific gravity of 1.114 at 77° F., and a mol ratio of formaldehyde to urea of 1.96 to 1.

In oil field or well treating operations, the retarder HMT may be greatly increased in concentration in order that the requirement of long set times at relatively high temperatures (90°–240° F. or more) may be met. Similarly, the ammonium chloride accelerator may be decreased in concentration to meet similar requirements. When earth temperatures are lower than 70° F. or if the mixing water is cold, the setting time may be extended beyond practical limits.

Suitable substitutions for the retarder, hexamethylenetetramine, are triethylamine or other tertiary amines, secondary and primary amines, and disoduim hydrogen phosphate or other buffering salts that do not raise the pH above 8 or 9 so that an undesirable precipitate of dimethylolurea is produced.

Suitable substitutions for the accelerator, ammonium chloride, are ammonium salts of strong acids such as ammonium sulfate, ammonium nitrate, etc. For relatively quick sets, mineral acids such as hydrochloric, nitric, sulfuric, etc., may be applied directly. For slower sets, weak acids such as acetic acid may be used.

It has been determined through controlled laboratory tests, that it is preferable to vary the amounts of HMT rather than ammonium chloride for regulating set time. When the concentration of ammonium chloride is relatively low, i.e. around 2 or 3 grams per 100 ml. of concentrate, increasing or decreasing the concentration has a marked effect on the set time. With higher concentrations of ammonium chloride, increasing amounts of ammonium chloride cause very little difference in the set time. Variations of the amounts of hexamethylenetetramine appear to result in a more flexible system.

The resin solution of the present invention has been field tested and proven in stabilizing an unconsolidated sand stratum underlying a gas compressor station and in the control of flow of water in a vertical underground shaft.

It can be appreciated that the present invention provides a new and improved urea-formaldehyde resin which is suitable for sealing water-bearing formations and/or consolidating loose sand or earthen formations.

The foregoing disclosure and description of the invention is illustrative and explanatory thereof and suitable variations may be made within the scope of the appended claims without departing from the spirit of the invention.

What is claimed is:

1. A method of sealing or consolidating earthen formations, consisting essentially of the steps of mixing a urea-formaldehyde concentrate with water, urea and a hardening agent thereby forming a low viscosity resin solution, introducing the resin solution before setting thereof into the earthen formation, and allowing the resin solution to set a predetermined length of time whereby a hard impermeable compound of high compressive strength is formed.

2. A method of sealing or consolidating earthen formations, consisting essentially of the steps of, placing a predetermined amount of water in a container, adding a predetermined amount of urea to said water and mixing said urea and said water, mixing a predetermined amount of hardening agent to the mixture of the previous step, mixing a predetermined amount of urea-formaldehyde concentrate with the mixture thereby forming a low viscosity resin solution, introducing the resin solution before setting thereof into the earthern formation to be treated, and allowing the resin solution to set a predetermined length of time whereby a hard impermeable mass having a high compressive strength is formed by said mixture.

3. A method of sealing or consolidating earthen formations, consisting essentially of the steps of, adding a predetermined amount of water to a container of suitable size, mixing a predetermined amount of urea with said water, mixing a predetermined amount of an accelerator to said water-urea mixture, mixing a predetermined amount of retarding agent to the mixture of the previous step, adding a predetermined amount of urea-formaldehyde concentrate thereby forming a low viscosity resinous solution, introducing said resinous solution before setting thereof into the earthen formations to be treated, and allowing said resinous solution to set a predetermined length of time whereby a hard impermeable mass of high compressive strength is formed therefrom.

4. A method of grouting or plugging irregular formations, consisting essentially of the steps of, adding a predetermined amount of water to a sufficiently large container at the grouting site, adding a predetermined amount of urea to said water in said container and mixing therewith, mixing a predetermined amount of ammonium chloride with said urea-water mixture, adding a predetermined amount of hexamethylenetetramine to the solution of the previous step, adding a predetermined amount of urea-formaldehyde concentrate to the solution and mixing same therewith to form a resinous solution of low viscosity, substantially immediately thereafter introducing the low viscosity resinous solution before setting thereof into the earth formation to be grouted, and allowing said resinous solution to set a predetermined amount of time whereby said solution forms a hard impermeable mass of high compressive strength.

5. A method of sealing or consolidating earthen formations, consisting essentially of the steps of, mixing a predetermined amount of urea-formaldehyde concentrate and a predetermined amount of water in a first container at the site of earth treating operations to thereby form a first solution of a predetermined amount, mixing a predetermined amount of urea, water and a catalyst in a second container at the site of earth treating operations to thereby form a predetermined amount of a second solution substantially equal to the amount of said first solution, pumping each of said solutions through separate lines to a predetermined mixing area, joining the two solutions together whereby a low viscosity resinous solution is formed, introducing said resinous solution before setting thereof into the earthen formation to be treated, and allowing said resinous solution to set a predetermined time whereby a hard impermeable mass of high compressive strength is formed.

6. A method of sealing or consilidating earthen formations, consisting essentially of the steps of, mixing a predetermined amount of urea-formaldehyde concentrate and a predetermined amount of water in a first container at the earth treating site thereby forming a first solution of a predetermined amount, mixing a predetermined amount of urea, water, ammonium chloride and hexamethylenetetramine in a second container at the earth treating site thereby forming a second solution in an amount substantially equal to the amount of said first solution subtsantially simultaneously pumping each of said solutions through separate lines to a predetermined mixing area where said first solution and said second solution are brought together in substantially equal amounts to thereby form a low viscosity resinous solution, introducing said resinous solution before setting thereof into the earth formation to be treated, and allowing said resinous solution to set a predetermined length of time whereby a hard impermeable mass of high compressive strength is formed.

7. A method of sealing or consolidating earthen formations, consisting esesntially of the steps of, mixing a predetermined amount of a urea-formaldehyde concentrate with predetermined amounts of water, urea, an accelerating agent and a retarding agent to thereby form a low viscosity resinous solution, introducing said reisnous solution before setting thereof into the earthen formation to be treated, and allowing said resinous solution to set a predetermined length of time whereby a hard impermeable mass is formed having a high compressive strength.

8. The method set forth in claim 7, wherein said accelerating agent is a compound selected from the group consisting of the ammonium salt of a strong acid, a mineral acid, an acetic acid.

9. The method set forth in claim 7, wherein said accelerating agent is a compound selected from the group consisting of hydrochloric acid, nitric acid and sulphuric acid.

10. The method set forth in claim 7, wherein said accelerating agent is selected from the group consisting of ammonium chloride, ammonium sulfate, and ammonium nitrate.

11. The method set forth in claim 7, wherein said retarding agent is an amine.

12. The method set forth in claim 7, wherein said retarding agent is a compound selected from the group consisting of a tertiary amine, a secondary amine, and a primary amine.

13. The method set forth in claim 7, wherein said retarding agent is a compound selected from the group consisting of hexamethylenetetramine and triethylamine.

14. The method set forth in claim 7, wherein said retarding agent is disodium hydrogen phosphate.

15. The method set forth in claim 7, wherein said accelerating agent is ammonium chloride and said retarding agent is hexamethylenetetramine.

16. A method of sealing or consolidating earthen formations, consisting essentially of the steps of:
 (a) mixing predetermined amounts of a urea-formaldehyde concentrate, urea, water and a hardening agent to thereby form a low viscosity resin solution;
   (1) said concentrate having a formaldehyde to urea mol ratio of substantially 4.5 to 1 and a solids content of about 85% by weight;
   (2) said urea being in a sufficient amount to obtain a formaldehyde to urea mol ratio of substantially 1.96 to 1; and,
   (3) said water being in sufficient amount to form a low viscosity resin solution;
 (b) introducing the low viscosity resin solution before the setting thereof into the earthen formation to be treated; and,
 (c) allowing the resin solution to set to a hard impermeable mass having a high compressive strength.

17. A method of sealing or consolidating earthen formations, comprising the steps of:
 (a) preparing a low viscosity resin solution by mixing about 36 gallons of a urea-formaldehyde concentrate, about 142 pounds of urea, about 50 gallons of water and a sufficient amount of hardening agent to set the resin solution after a predetermined time, said concentrate having a formaldehyde to urea mol ratio of substantially 4.5 to 1 and a solids content of about 85% by weight;
(b) introducing the low viscosity resin solution before the setting thereof into the earthen formation to treated; and,
(a) allowing the resin solution to set to a hard impermeable mass having a high compressive strength.

References Cited by the Examiner
UNITED STATES PATENTS

| | | | |
|---|---|---|---|
| Re. 23,393 | 7/51 | Kurtz | 166—33 |
| 2,236,184 | 3/41 | Menger | 260—71 |
| 2,312,210 | 2/43 | Dearing | 260—71 |
| 2,433,680 | 12/47 | Backman | 260—71 |
| 2,492,212 | 12/49 | Dailey | 166—33 |
| 2,606,880 | 8/52 | Yourtee | 260—71 |
| 2,788,337 | 4/57 | Preiswerk. | |

EARL J. WITMER, *Primary Examiner.*

WILLIAM I. MUSHAKE, JACOB L. NACKENOFF,
*Examiners.*